(12) United States Patent
Lee et al.

(10) Patent No.: US 11,718,155 B2
(45) Date of Patent: Aug. 8, 2023

(54) HEAT GENERATOR USING CARBON NANO TUBE COMPOSITE MATERIAL

(71) Applicants: HYUNDAI MOTOR COMPANY, Seoul (KR); KIA MOTORS CORPORATION, Seoul (KR); Duck Yang Industry Co., Ltd., Ulsan (KR)

(72) Inventors: Jae-Seung Lee, Hwaseong-si (KR); Kwang-Seub Kim, Daejeon (KR)

(73) Assignees: HYUNDAI MOTOR COMPANY, Seoul (KR); KIA MOTORS CORPORATION, Seoul (KR); DUCK YANG INDUSTRY CO., LTD., Ulsan (KR)

( * ) Notice: Subject to any disclaimer, the term of this patent is extended or adjusted under 35 U.S.C. 154(b) by 630 days.

(21) Appl. No.: 16/938,090

(22) Filed: Jul. 24, 2020

(65) Prior Publication Data
US 2021/0268872 A1    Sep. 2, 2021

(30) Foreign Application Priority Data
Feb. 28, 2020 (KR) .......................... 10-2020-0025173

(51) Int. Cl.
| | | |
|---|---|---|
| *B60H 1/22* | (2006.01) | |
| *C01B 32/158* | (2017.01) | |
| *H05B 3/14* | (2006.01) | |
| *H05B 3/03* | (2006.01) | |

(52) U.S. Cl.
CPC ......... *B60H 1/2225* (2013.01); *C01B 32/158* (2017.08); *H05B 3/03* (2013.01); *H05B 3/145* (2013.01); *B60H 2001/2278* (2013.01)

(58) Field of Classification Search
CPC ............... B60H 1/2225; B60H 1/2227; B60H 1/00295; B60H 1/00385; B60H 2001/2278; B60H 2001/2293; C01B 32/158; H05B 3/03; H05B 3/145; H05B 3/34; H05B 3/14; H05B 3/06; H05B 2214/04; B60N 2/56; B62D 1/06
See application file for complete search history.

(56) References Cited

U.S. PATENT DOCUMENTS

| | | | | |
|---|---|---|---|---|
| 2018/0297602 A1 * | 10/2018 | Richmond | ............... | B62D 1/06 |
| 2020/0187307 A1 * | 6/2020 | Pizzi | ......................... | H05B 3/03 |
| 2022/0394821 A1 * | 12/2022 | Tong | ......................... | H05B 3/34 |

FOREIGN PATENT DOCUMENTS

| | | | | |
|---|---|---|---|---|
| EP | 2136603 B1 * | 8/2015 | ............... | H05B 3/14 |
| KR | 10-2019-0110354 A | 9/2019 | | |

* cited by examiner

*Primary Examiner* — Shawntina T Fuqua
(74) *Attorney, Agent, or Firm* — Morgan, Lewis & Bockius LLP (57) ABSTRACT

A heat generator using a Carbon Nano Tube (CNT) composite material includes: an outer electrode part; an inner electrode part which faces the outer electrode part and is spaced apart from the outer electrode part at a predetermined distance; a connection part which connects the outer electrode part with the inner electrode part; and a bracket part which is disposed in the outer electrode part and the inner electrode part including the connection part to shield the outer electrode part, the inner electrode part and the connection part from each other. A surface of the connection part does not face directly the outer electrode part and the inner electrode part. The outer electrode part and the inner electrode part include electrodes having polarities different from each other.

10 Claims, 5 Drawing Sheets

HEAT GENERATOR USING CARBON NANO TUBE COMPOSITE MATERIAL

CROSS-REFERENCE TO RELATED APPLICATION

This application claims priority to Korean Patent Application No. 10-2020-0025173, filed on Feb. 28, 2020, which is incorporated herein by reference in its entirety.

TECHNICAL FIELD

The present disclosure relates to a heat generator using a Carbon Nano Tube (CNT) composite material, and more particularly, to a heat generator using a CNT composite material applied to a vehicle.

BACKGROUND

Various devices are provided in a vehicle for comfortable riding of passengers.

Among them, an air conditioner has an in-vehicle temperature control function to help the passengers move comfortably.

Particularly, a heat generator occupies a very important part.

For example, a steering wheel may be provided with a heating wire so that the steering wheel is not cold, and a seat is provided with a heating wire to prevent coldness.

However, since the steering wheel or the seat may be a portion where a body part of a vehicle passenger is most frequently in contact with the vehicle, it is a common technology to add the heating wire as a heat generator.

However, some vehicles are provided with the heating wire in a portion where the passenger's body may contact a other than the steering wheel or the seat.

For example, in some high-end models, the heating wire may be additionally provided in a door handle, an armrest, or the like.

Such a heat generator enables more comfortable driving by preventing a passenger's arm part from feeling cold when contacting an interior material of the vehicle.

However, there has been a problem in that the heating wire of the conventional vehicles has low thermal efficiency.

That is, there is a problem in that the heat generated by using the heating wire is degraded in thermal efficiency due to a heat-generating area smaller than the applied area.

Further, the conventional method using the heating wire has a limitation in that a manufacturing process including the heating wire is increased and an application range thereof is limited.

The contents described in Description of Related Art are to help the understanding of the background of the present disclosure, and may include what is not previously known to those skilled in the art to which the present disclosure pertains.

SUMMARY

To overcome the above problems of the related art, an object of the present disclosure is to provide a heat generator using a Carbon Nano Tube (CNT) composite material, which increases heat-generating efficiency even while reducing air conditioning load of an electric vehicle by using a CNT mixture.

The present disclosure for achieving the object provides a heat generator using a Carbon Nano Tube (CNT) composite material including, in the heat generator: an outer electrode part; an inner electrode part which faces the outer electrode part and is spaced apart from the outer electrode part at a predetermined distance; a connection part which connects the outer electrode part with the inner electrode part; and a bracket part disposed in the outer electrode part and the inner electrode part including the connection part and shielding the outer electrode part, the inner electrode part and the connection part so that a surface of the connection part does not directly face the outer electrode part and the inner electrode part. The outer electrode part and the inner electrode part include electrodes having polarities different from each other, and have a heat-generating area, which is heat-generated by a current flowing through a CNT composite material disposed between the outer electrode part and the inner electrode part.

The outer electrode part has a front electrode part, which may be formed in a longitudinal direction of a vehicle, and a front end electrode part, which is bent at and extends from the end of the front electrode part in an inner direction of the vehicle, the bracket part has a front bracket part which surrounds to shield the outer circumferential surface of the front electrode part, and the inner electrode part comprises a front counter electrode part which is formed parallel with the front end electrode part with being spaced at a predetermined distance apart from the front end electrode part.

The outer electrode part has a rear electrode part, which may be formed in a longitudinal direction of a vehicle, and a rear end electrode part, which is bent at and extends from the end of the rear electrode part in an inner direction of the vehicle, the bracket part has a rear bracket part which surrounds to shield the outer circumferential surface of the rear electrode part, and the inner electrode part includes a rear counter electrode part which is formed parallel with the rear end electrode part with being spaced at a predetermined distance apart from the rear end electrode part.

The outer electrode part has a central electrode part which may be formed in a longitudinal direction of a vehicle, the bracket part has a front connection bracket part which extends vertically from one end of the central electrode part in an inner direction of the vehicle, a rear connection bracket part which extends vertically from the other end of the central electrode part toward an inner direction of the vehicle, and a central bracket part which connects the front connection bracket part with the rear connection bracket part, and the inner electrode part includes a central counter electrode part which faces the central electrode part with being provided in the central bracket part.

At least two of a pair of counter electrodes composed of the outer electrode part and the inner electrode part are provided, the heat-generating area includes at least two heat-generating areas while being provided between the pair of the counter electrodes, and current directions of any one of the plurality of heat-generating areas and another one adjacent thereto are not parallel with each other.

The central counter electrode part and the central electrode part are formed to have a slope with respect to each other.

The outer electrode part has a "U" shape as a whole, including a front end electrode part, a central electrode part, and a rear end electrode part.

Lengths of the front end electrode part and the rear end electrode part 103 are formed differently from each other.

The front connection bracket part, the central bracket part, and the rear connection bracket part have parts of the side surfaces cut.

The front connection bracket part has the part of the side surface facing the front end electrode part cut, the central bracket part has the part of the side surface facing the central electrode part cut, and the rear connection bracket part has the part of the side surface facing the rear end electrode part cut.

The present disclosure as described above has the following effects.

Firstly, it is possible to increase the heat-generating efficiency even while reducing the air conditioning load of the electric vehicle.

Secondly, it is possible to improve the heat-generating efficiency even while having the simple structure.

Thirdly, since the present disclosure provides the heat generator using the CNT composite material, the heat transfer is evenly possible to suppress the non-uniformity of the heat distribution, thereby providing the comfortable boarding environment.

Fourthly, the heat generator may be simply installed where the heat-generation is required, thereby reducing the manufacturing process.

DESCRIPTION OF SPECIFIC EMBODIMENTS

The present disclosure may have various modifications and various embodiments, and illustrates specific embodiments in the drawings and specifically describes them in the detailed description. However, it should be understood that this is not intended to limit the present disclosure to the specific embodiment, and includes all modifications, equivalents, and substitutes included in the spirit and technical scope of the present disclosure.

In describing each drawing, similar reference numerals are used for similar components.

Terms such as first and second may be used to describe various components, but the components should not be limited by the terms. The terms are used only for the purpose of distinguishing one component from other components.

For example, the first component may be referred to as a second component without departing from the scope of the present disclosure, and similarly, the second component may also be referred to as the first component. The term "and/or" includes a combination of a plurality of related described items or any one of the plurality of related described items.

Unless defined otherwise, all terms used herein, including technical or scientific terms, have the same meaning as commonly understood by those skilled in the art to which the present disclosure pertains.

Terms such as those defined in a commonly used dictionary should be construed as having meanings consistent with meanings in the context of related technologies, and should not be construed as ideal or excessively formal meanings unless explicitly defined in the present application.

First, the overall structure of a heat generator using a CNT composite material according to an exemplary embodiment of the present disclosure will be schematically described and the detailed structure will be described later.

An outer electrode part 100 according to an exemplary embodiment of the present disclosure may be formed in parallel with a longitudinal direction of a vehicle or to have a predetermined angle in a heat generator.

That is, the outer electrode part 100 may have both a portion parallel to the longitudinal direction of the vehicle and a portion having a predetermined angle with respect to the longitudinal direction of the vehicle.

An inner electrode part 200 faces the outer electrode part 100 with being spaced a predetermined distance apart from the outer electrode part 100.

A connection part 150 may be a portion which connects the outer electrode part 100 with the inner electrode part 200.

A bracket part 300 may be provided in the outer electrode part 100 and the inner electrode part 200 including the connection part 150 and serves as a shielding which surrounds the outer electrode part 100, the inner electrode part 200 and the connection part 150 so that the portion of the connection part 150 does not directly face the outer electrode part 100 and the inner electrode part 200.

That is, the connection part 150 may not have electrical polarity.

The outer electrode part 100 and the inner electrode part 200 may be formed of electrodes having polarities different from each other.

A heat-generating area may be an area which is heat-generated by a current flowing through the CNT composite material provided between the outer electrode part 100 and the inner electrode part 200.

More specifically, the outer electrode part 100 according to an exemplary embodiment of the present disclosure may have a front electrode part 104 which may be formed in a longitudinal direction of the vehicle and a front end electrode part 101 which is bent at and extends from the end of the front electrode part 104 in an inner direction of the vehicle.

The bracket part 300 may have a front bracket part 301 which surrounds to shield the outer circumferential surface of the front electrode part 104.

The inner electrode part 200 may include a front counter electrode part 201 which is formed parallel with the front end electrode part 101 with being spaced at a predetermined distance apart from the front end electrode part 101. The heat-generating area becomes a first heat-generating area.

On the other hand, the outer electrode part 100 may also have a rear electrode part 105 which is formed in the longitudinal direction of the vehicle and a rear end electrode part 103 which is bent at and extends from the end of the rear electrode part 105 in an inner direction of the vehicle. Here, the bracket part may have a rear bracket part 307 which surrounds (to shield) the outer circumferential surface of the rear electrode part 105.

The inner electrode part 200 may include a rear counter electrode part 205 which may be formed parallel with the rear end electrode part 103 with being spaced at a predetermined distance apart from the rear end electrode part 103.

At this time, the heat-generating area becomes a second heat-generating area.

On the other hand, the outer electrode part 100 may have a central electrode part 102 which is formed in the longitudinal direction of the vehicle.

At this time, the bracket part 300 may have a front connection bracket part 302 which extends vertically from one end of the central electrode part 102 in the inner direction of the vehicle, a rear connection bracket part 306 which extends vertically from the other end of the central electrode part 102 toward the inner direction of the vehicle, and a central bracket part 304 which connects between the front connection bracket part 302 and the rear connection bracket part 306.

The inner electrode part 200 may include a central counter electrode part 203 which faces the central electrode part 102 with being provided in the central bracket part 304. Here, the heat-generating area becomes a third heat-generating are.

That is, the heat generator using the CNT composite material according to an exemplary embodiment of the present disclosure may also be expressed as follows.

At least two of a pair of counter electrodes composed of the outer electrode part 100 and the inner electrode part 200 may be provided.

The pair of counter electrodes refers to a pair of outer electrode part 100 and inner electrode part 200 facing each other.

The heat-generating area may be provided between the pair of counter electrodes and may include at least two heat-generating areas. Here, current directions of any one of the plurality of heat-generating areas and another one adjacent thereto may not be parallel to each other.

The outer electrode 100 part may have a "U" shape as a whole, including the front end electrode part 101, the central electrode part 102, and the rear end electrode part 103.

Next, a detailed structure of the heat generator according to an exemplary embodiment of the present disclosure will be described.

The heat generator according to an exemplary embodiment of the present disclosure is a principle which is heat-generated through the electrode part provided in the CNT composite material.

The heat generator according to an exemplary embodiment of the present disclosure includes an electrode part and a heat-generating zone.

More specifically, the electrode part includes a first electrode part 100 and a second electrode part 200 having polarities opposite to each other.

For the purpose of explanation on the exemplary embodiment of the present disclosure, the outer electrode part 100 may be referred to as the first electrode part 100, and the inner electrode part 200 may be referred to as the second electrode part 200.

Further, the electrode part includes at least two heat-generating zones in which the electric field directions formed between the first electrode part 100 and the second electrode part 200 are formed differently from each other.

A bracket part 300 shields the second electrode part 200 from the first electrode part 100.

The first electrode part 100 may be formed so that the overall vertical cross-section with respect to the longitudinal direction is exposed, and the second electrode part 200 may be formed so that the vertical cross-section with respect to the longitudinal direction is partially exposed.

The "overall" of the overall exposed one described below refers to a complete exposure which does not cover any part of the outer circumferential surface thereof.

Further, "partially" of one partially exposed refers to a part of a state where a part of the outer circumferential surface is covered.

The first electrode part 100 may have a "U" shape as a whole, including the front end electrode part 101, the central electrode part 102, and the rear end electrode part 103. Here, the lengths of the front end electrode part 101 and the rear end electrode part 103 may be formed differently from each other.

More specifically, the second electrode part 200 may include the front counter electrode part 201, the central counter electrode part 203, and the rear counter electrode part 205.

The front counter electrode part 201 faces parallel to the front end electrode part 101.

A current flows between the front counter electrode part 201 and the front end electrode part 101, and heat is generated.

At this time, the heat-generating area between the front counter electrode part 201 and the front end electrode part 101 is referred to as a first heat-generating area.

A principle of the heat generation which is heat-generated through the electrode part provided on the CNT composite material (hereinafter also referred to as CNT heat-generating body) is as follows.

The CNT heat-generating body may be a component which is made of a CNT mixture and having an electrode to generate heat by itself when the electrode is electrically conducted.

More specifically, the CNT heat-generating body has the properties of a conductor by combining a CNT, which may be a conductive additive, with a polymer compound.

Accordingly, as the principle, when electricity is applied to the CNT heat-generating body, heat is generated in a process of electron movement.

The central counter electrode part 203 connects the front counter electrode part 201 with the rear counter electrode part 205, and the central counter electrode part 203 faces the central electrode part 102.

Since the central counter electrode part 203 faces the central electrode part 102, heat is generated while a current flows between the central counter electrode part 203 and the central electrode part 102.

The heat-generating area between the central counter electrode part 203 and the central electrode part 102 is referred to as a second heat-generating area. The central counter electrode part 203 may have a slope with respect to the central electrode part 102.

That is, a length of the central counter electrode part 203 may be longer than a length of the central electrode part 102.

More specifically, the central counter electrode part 203 may be exposed to face the central electrode part 102, and may have a slope to be away from the central electrode part 102 toward a direction which is away from the front end electrode part 101.

Accordingly, a length of the front counter electrode part 201 may be shorter than a length of the rear counter electrode part 205.

However, the length of the front counter electrode part 201 may be equal to the length of the front end electrode part 101.

Accordingly, electrons may be evenly moved between the front counter electrode part 201 and the front end electrode part 101, thereby generating heat evenly.

Figure 1:
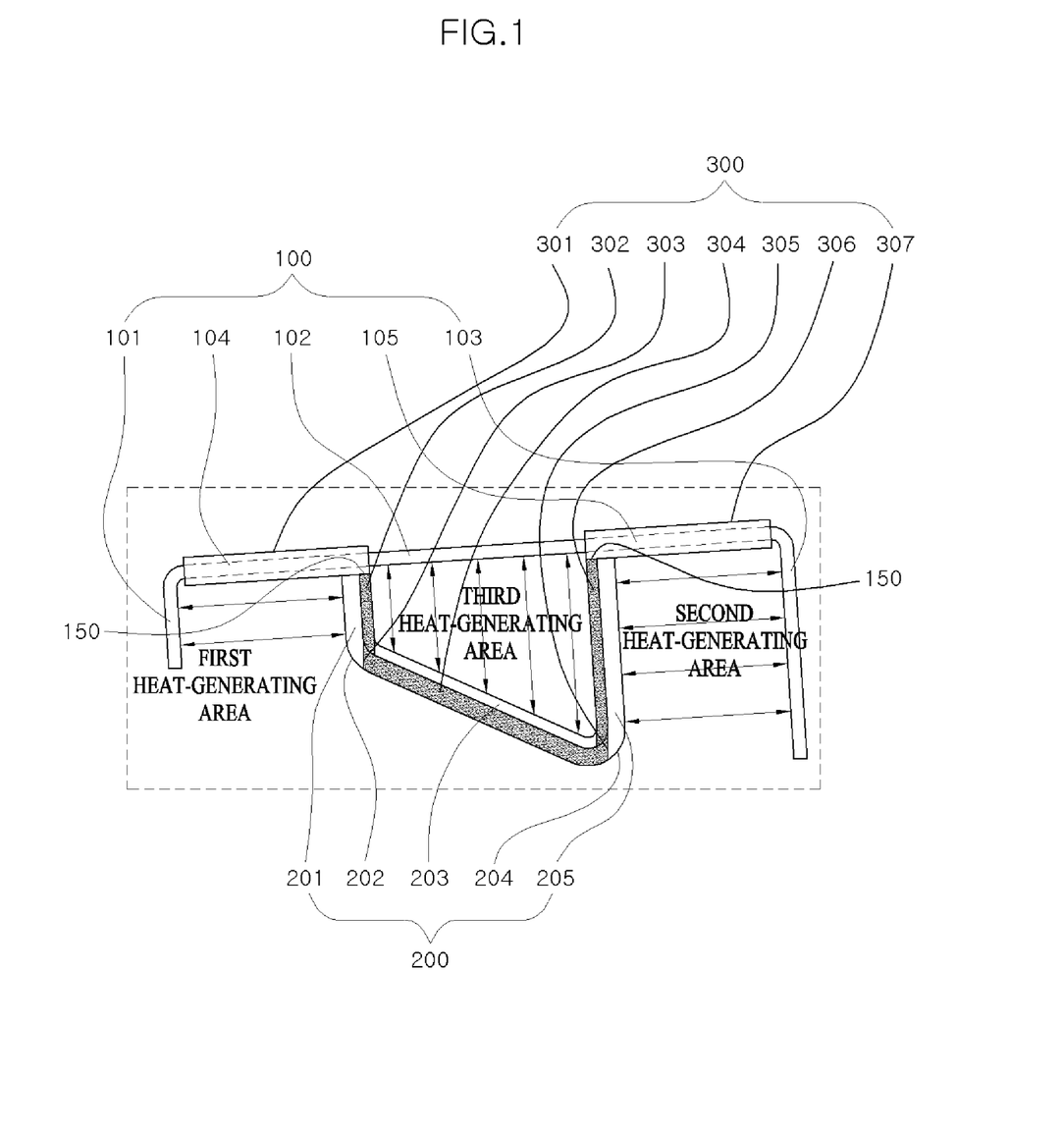
FIG. 1 is a diagram illustrating a structure of a heat generator using a Carbon Nano Tube (CNT) composite material according to an exemplary embodiment of the present disclosure.

As indicated by the red double-headed arrow in FIG. 1, it should be noted that the current flow direction in the second heat-generating area is different from the current flow directions in the first heat-generating area and the second heat-generating area.

Further, the second electrode part 200 may be arranged between the front end electrode part 101 and the rear end electrode part 103.

The front counter electrode part 201 and the central electrode part 102 may be orthogonal to each other.

Further, the rear counter electrode part 205 and the central electrode part 102 may be orthogonal to each other.

The rear counter electrode part 205 may be opposite parallel to the rear end electrode part 103.

Accordingly, heat may be generated while a current flows between the rear counter electrode part 205 and the rear end electrode part 103.

At this time, the heat-generating area between the rear counter electrode part 205 and the rear end electrode part 103 is referred to as a third heat-generating area.

The bracket part 300 may include a front bracket part 301 and a rear bracket part 307 which are provided to be spaced apart from each other with all exposed part interposed therebetween. Here, a length of the front bracket part 301 may be equal to a length of the rear bracket part 307.

Figure 2:
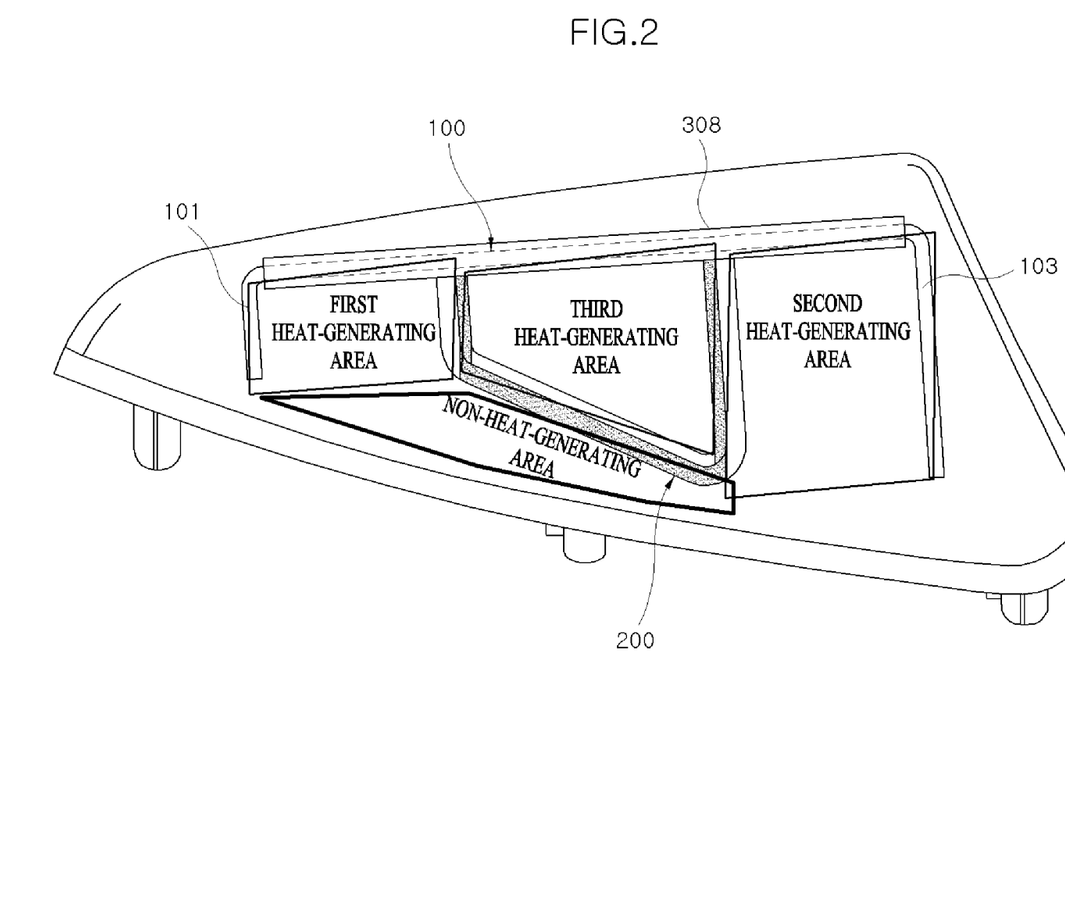
FIG. 2 is a diagram illustrating appearances of a heat-generating area and a non-heat-generating area of the heat generator using the CNT composite material according to an exemplary embodiment of the present disclosure.
Figure 3:
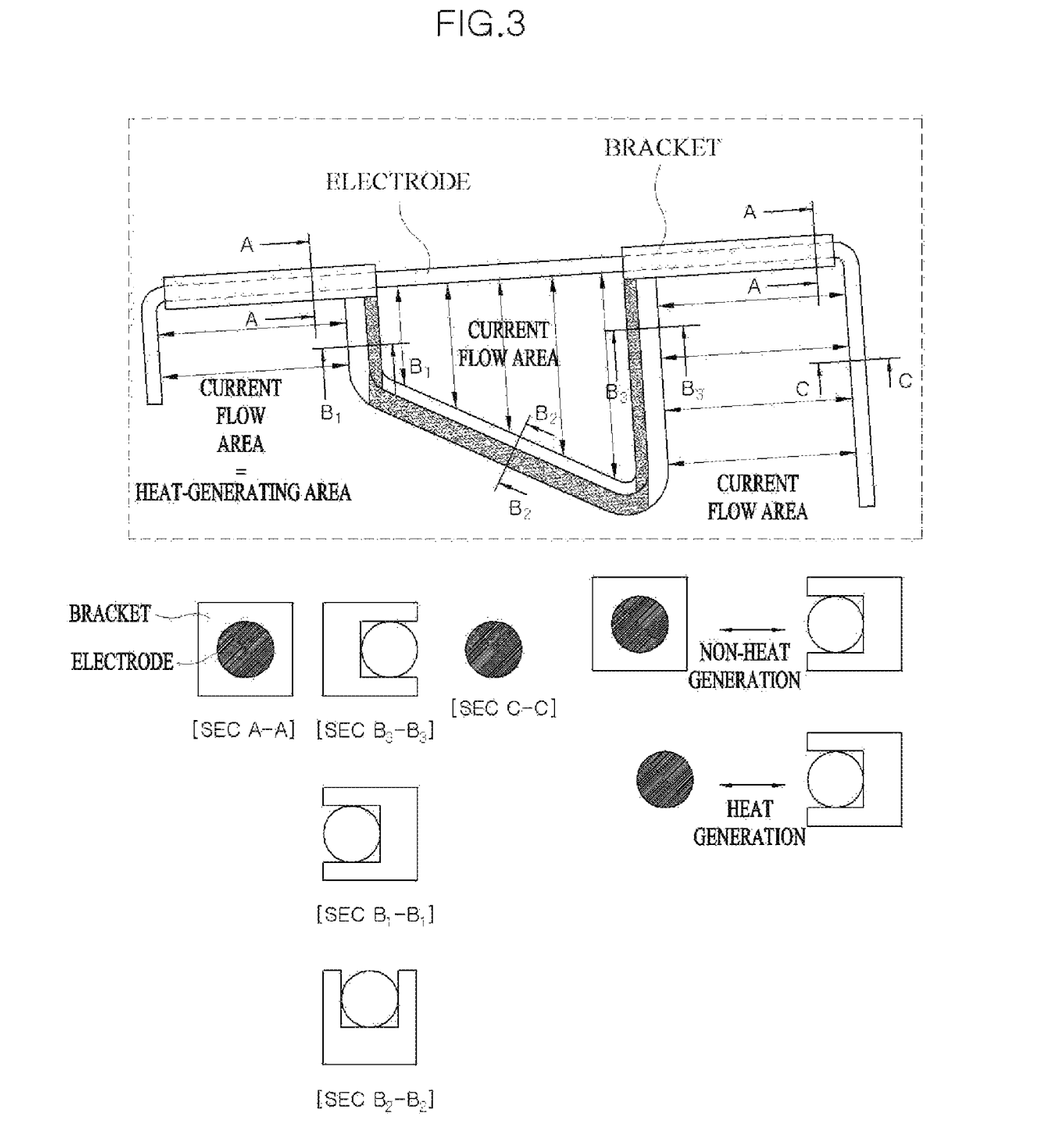
FIG. 3 is a cross-sectional diagram for each portion of the heat generator using the CNT composite material according to an exemplary embodiment of the present disclosure.
Figure 4:
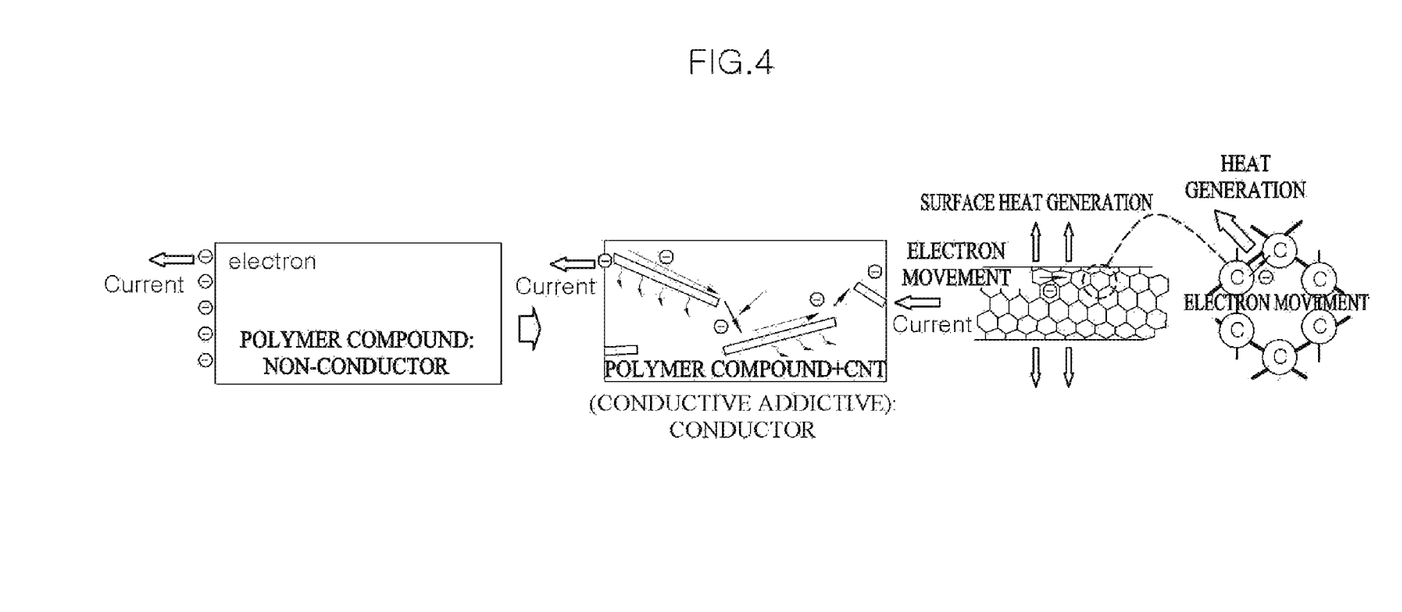
FIG. 4 is a schematic diagram of a heat-generating principle of the CNT composite material (mixture) according to an exemplary embodiment of the present disclosure.
Figure 5:
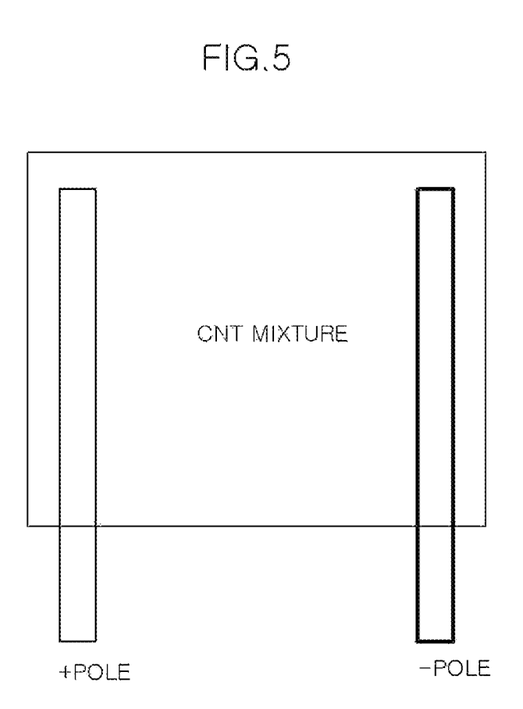
FIG. 5 is a diagram illustrating an electrode configuration of the CNT composite material (mixture) according to an exemplary embodiment of the present disclosure.

As shown in FIG. 2, the front bracket part 301 and the rear bracket part 307 may be integrally formed as an integral bracket part 308 to completely shield some sections of the first electrode part 100 including the central electrode part 102.

Further, the bracket part 300 may include the front connection bracket part 302 and the rear connection bracket part 306 which are spaced at a predetermined distance apart from each other while forming the partially exposed part. Here, a length of the front connection bracket part 302 may be smaller than a length of the rear connection bracket part 306.

The bracket part 300 may include the front connection bracket part 302 and the central bracket part 304 which connects the rear connection bracket part 306.

A length of the central bracket part 304 may be a distance between a first point 303 and a second point 305. In the central bracket part 304, the first point 303 may be a point which is closest to the central electrode part 102, and the second point 305 may be a point which is maximally spaced apart from the central electrode part 102. The length of the central bracket part 304 may be longer than the length of the central electrode part 102.

The front connection bracket part 302, the center bracket part 304, and the rear connection bracket part 306 may partially expose the second electrode part 200.

That is, the front connection bracket part 302, the center bracket part 304, and the rear connection bracket part 306 may partially shield the second electrode part 200, respectively. The side surface facing the front end electrode part 101, the side surface facing the rear end electrode part 103, and the side surface facing the central electrode part 102 may be formed by exposing a part thereof, respectively.

The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A heat generator using a Carbon Nano Tube (CNT) composite material comprising:
   an outer electrode part;
   an inner electrode part which faces the outer electrode part and is arranged to be spaced apart from the outer electrode part at a predetermined distance;
   a connection part connecting the outer electrode part with the inner electrode part; and
   a bracket part disposed in the outer electrode part and the inner electrode part including the connection part and shielding the outer electrode part, the inner electrode part and the connection part so that a surface of the connection part do not face directly the outer electrode part and the inner electrode part,
   wherein the outer electrode part and the inner electrode part include electrodes having polarities different from each other, and include a heat-generating area, which is heat-generated by a current flowing through a CNT composite material disposed between the outer electrode part and the inner electrode part.

2. The heat generator of claim 1,
   wherein the outer electrode part comprises:
      a front electrode part, which extends in a longitudinal direction of a vehicle; and
      a front end electrode part, which is bent at and extends from an end of the front electrode part in an inner direction of the vehicle,
   wherein the bracket part has a front bracket part which surrounds to shield an outer circumferential surface of the front electrode part, and
   wherein the inner electrode part comprises a front counter electrode part which is parallel to the front end electrode part and spaced apart from the front end electrode part at a predetermined distance.

3. The heat generator of claim 1,
   wherein the outer electrode part comprises:
      a rear electrode part, which extends in a longitudinal direction of a vehicle; and
      a rear end electrode part, which is bent at and extends from an end of the rear electrode part in an inner direction of the vehicle,
   wherein the bracket part has a rear bracket part which surrounds to shield an outer circumferential surface of the rear electrode part, and
   wherein the inner electrode part comprises a rear counter electrode part which is parallel to the rear end electrode part and spaced apart from the rear end electrode part at a predetermined distance.

4. The heat generator of claim 1,
   wherein the outer electrode part has a central electrode part which extends in a longitudinal direction of a vehicle,
   wherein the bracket part comprises:
      a front connection bracket part which extends vertically from one end of the central electrode part in an inner direction of the vehicle;
      a rear connection bracket part which extends vertically from another end of the central electrode part toward an inner direction of the vehicle; and
      a central bracket part which connects the front connection bracket part with the rear connection bracket part, and
   wherein the inner electrode part comprises a central counter electrode part which faces the central electrode part in the central bracket part.

5. The heat generator of claim 1,
   wherein the heat generator includes at least two of a pair of counter electrodes comprising the outer electrode part and the inner electrode part, wherein the heat-generating area comprises at least two heat-generating areas arranged between the pair of the counter electrodes, and wherein current directions of any one of the plurality of heat-generating areas and another one adjacent thereto are not parallel with each other.

6. The heat generator of claim 4, wherein the central counter electrode part is arranged have a slope with respect to the central electrode part.

7. The heat generator of claim 4, wherein the outer electrode part has a "U" shape as a whole, and comprises a front end electrode part, a central electrode part, and a rear end electrode part.

8. The heat generator of claim 7, wherein the front end electrode part and the rear end electrode part have different lengths.

9. The heat generator of claim 8, wherein the front connection bracket part, the central bracket part, and the rear connection bracket part have parts of side surfaces cut.

10. The heat generator of claim 9, wherein the front connection bracket part has the part of the side surface facing the front end electrode part cut, wherein the central bracket part has the part of the side surface facing the central electrode part cut, and wherein the rear connection bracket part has the part of the side surface facing the rear end electrode part cut.

* * * * *